Patented Mar. 28, 1944

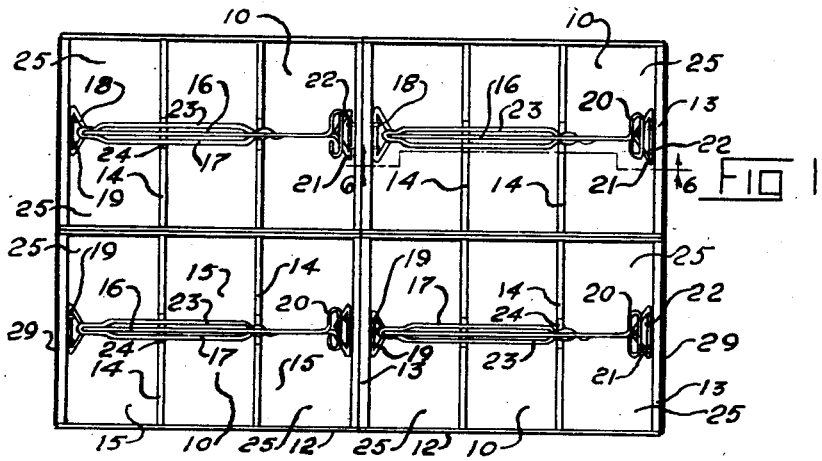
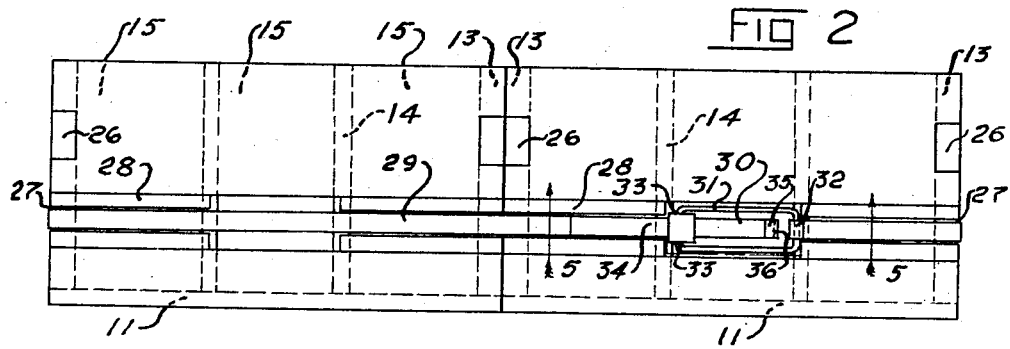
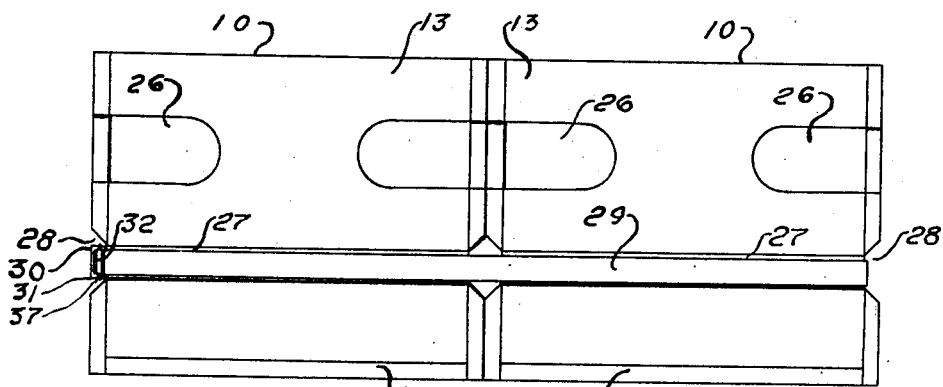

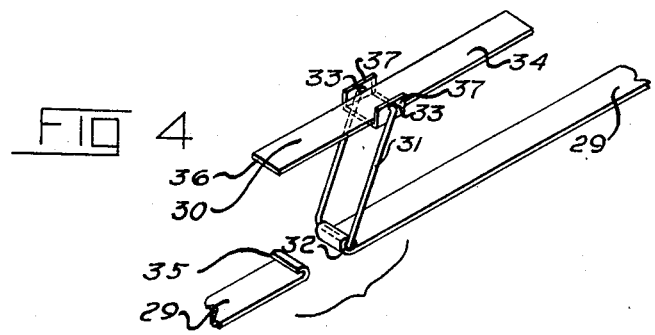
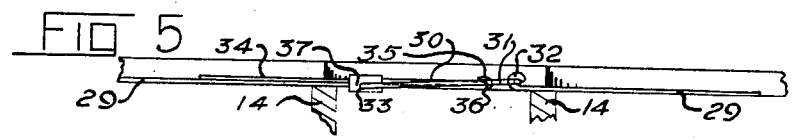
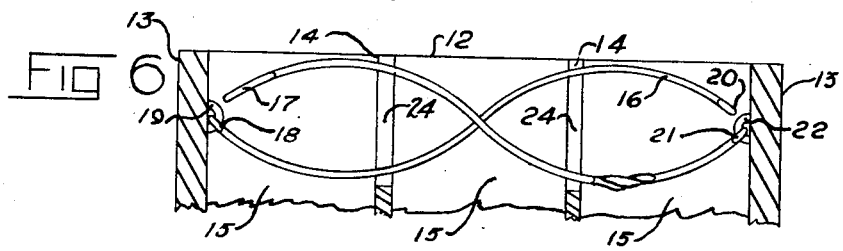
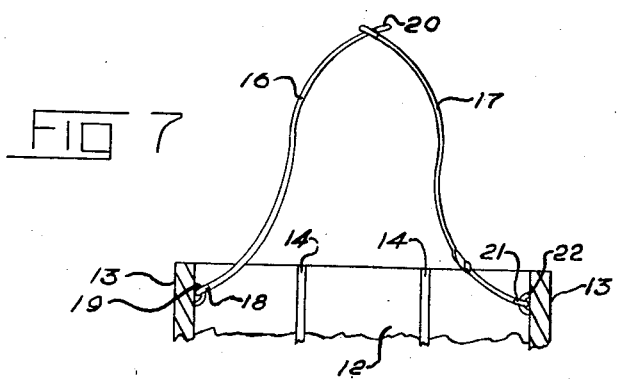
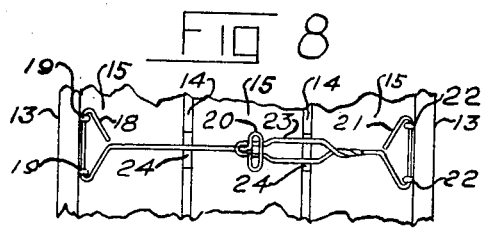

2,345,347

UNITED STATES PATENT OFFICE 2,345,347

ARTICLE HANDLING APPARATUS

James K. McLeod, St. Paul, Minn., assignor of one-third to Henry F. Carmody, Minneapolis, and one-third to Reuben Hove, St. Paul, Minn.

Application December 8, 1941, Serial No. 422,183

14 Claims. (Cl. 206—65)

This invention relates to an article handling apparatus useful for many purposes but more especially adapted for use in the transportation of beverages, as, for example, from factory to store, and thence to consumer.

An object of the invention is to provide an article handling apparatus which will be of novel and improved construction.

A further object is to provide an apparatus of the present character wherein will be incorporated various improved features and characteristics of construction which will be novel both as individual entities of the apparatus and in combination with each other.

A further object is to provide a novel and improved apparatus of simple, economical and practical construction designed to be especially useful to the purpose of transporting bottled beverages.

And a further object is to provide an article handling apparatus which will include features and characteristics as hereinafter explicitly set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 1 is a top plan view of an article handling apparatus made according to the invention;

Fig. 2 is an enlarged side elevational view of the apparatus;

Fig. 3 is an end elevational view of the apparatus on a scale greater than that of Fig. 2;

Fig. 4 is a perspective view of a fastener clamp of the apparatus;

Fig. 5 is a detail sectional view, taken substantially on line 5—5 in Fig. 2;

Fig. 6 is a detail sectional view of one of duplicate carriers of the article handling apparatus, taken substantially on line 6—6 in Fig. 1;

Fig. 7 is a view corresponding generally with the disclosure of Fig. 6, on a reduced scale, and disclosing the handle of the carrier in a different position; and Fig. 8 is a fragmentary plan view, on the scale of Fig. 7, of any one of the duplicate carriers of the apparatus, disclosing the handle of said carrier positioned as in said Fig. 7.

With respect to the drawings and the numerals of reference thereon, the article handling apparatus includes a plurality of individual carriers, each denoted 10. As disclosed, there are four duplicate carriers 10, although a greater or a less number of carriers could be employed.

Each carrier 10 is of rectilinear configuration, and desirably may be composed of wood, or of other suitable material. More explicitly, each carrier 10 includes a bottom wall 11, upstanding spaced apart parallel side walls 12, 12 and upstanding spaced apart parallel end walls 13, 13. The side and end walls 12, 12, 13, 13 meet and are joined to the bottom wall 11 and extend perpendicularly upwardly from said bottom wall, and said side and end walls meet and are joined to each other at the four corners of each carrier 10. Spaced apart partition walls 14 extend transversely of each carrier 10, between the side walls 12, 12 thereof and meet the bottom wall 11. Said partition walls 14 are secured to said bottom wall 11 and said side walls 12, 12 in any suitable and convenient manner. As shown, each carrier 10 includes two spaced apart partition walls 14 which divide the carrier into three separate compartments, each designated 15, of equal width disposed transversely of the carrier. The upper edges of all of the walls 12, 13 and 14 desirably terminate in a single plane.

A combination handle and partition for each carrier 10 consists of two separate lengths or pieces of wire or material, represented 16 and 17, respectively. Each length or piece of wire or material 16 has one of its ends 18 pivotally supported, as by spaced eyes 19, upon the internal surface of one of the end walls 13, and its other end portion shaped to provide a stud or male fastener member 20. Each length or piece of wire or material 17 has one of its ends 21 pivotally supported, as by spaced eyes 22, upon the internal surface of the end wall 13 opposite the end wall pivotally supporting the length or piece of wire or material 16, and its other end portion shaped to provide a loop or female fastener member 23. The lengths or pieces of wire or material 16 and 17 are mounted upon the end walls 13, 13 of each carrier 10 for pivotal movement in a vertical plane, and said lengths or pieces 16 and 17, in the instance of each carrier, are in alinement with each other in direction longitudinally of the carrier. Preferably, the lengths or pieces of wire or material 16 and 17 are at the midwidth of the corresponding carrier. The stud or male fastener member 20 is disposed transversely of its corresponding carrier within its corresponding loop or female fastener member 23, and each stud or male fastener member has length greater than a dimension representing the width of the loop or female fastener member with which the stud or male fastener member is associated or assembled.

Each partition wall 14 of each carrier 10 is provided with a vertical slot 24 which extends downwardly from the midlength of its upper edge.

The spaced apart eyes 19 and 22 are disposed in slightly spaced relation to the open top of the corresponding carrier 10, about as disclosed in the drawings, and the construction and arrangement are such that the lengths or pieces of wire or material 16 and 17, providing a combination handle and partition for each carrier, can be swung or moved from positions as in Figs. 1 and 6 to positions as in Figs. 7 and 8, and vice versa. That is, the lengths or pieces 16 and 17 are swingable or movable from positions as in Figs. 7 and 8 to positions as in Figs. 1 and 6, where said lengths or pieces are disposed wholly within the carrier and lie in the vertical slots 24, and are swingable or movable from positions as in said Figs. 1 and 6 to positions as in said Figs. 7 and 8, where said lengths or pieces are disposed without the carrier save for the parts of the lengths or pieces next adjacent the spaced eyes 19 and 22. When the lengths or pieces 16 and 17 are situated as in Figs. 1 and 6 they constitute, in the instance of each carrier 10, a partition dividing each compartment 15 into equal smaller compartments 25, each adapted separately to receive an article, such as a bottle, and when said lengths or pieces 16 and 17 are situated as in Figs. 7 and 8 they constitute a supporting handle for the corresponding carrier. It will be seen that in Figs. 1 and 6 the stud or male fastener member 20 is disposed adjacent the spaced eyes 22 and the loop or female fastener member 23 is disposed adjacent the spaced eyes 19, while in Figs. 7 and 8 said stud or male fastener member is engaged against the free end of the loop or female fastener member. The construction and arrangement are such that the members 20 and 23 cannot become accidentally removed the one from the other.

The outer surface of each end wall 13 of each carrier 10 is provided with a pair of alined grip depressions or hand holds 26, including a grip depression or hand hold adjacent the opposite ends of each end wall opening to the adjacent side wall 12 of the corresponding carrier.

Mechanism is included for releasably fastening or locking a plurality of carriers 10 to each other in order that the carriers can be transported as a unitary structure.

As disclosed, the outer surface of each end wall 13 of each carrier 10 is provided with a horizontal slot 27 which extends transversely of the carrier, and the outer surface of each side wall 12 of each carrier 10 is provided with a horizontal slot 28 which extends longitudinally of the carrier. The horizontal slots 27 and 28 are in spaced relation to the bottom wall 11, as well as in spaced relation to the grip depressions or hand holds 26, between said bottom wall and said grip depressions or hand holds, and the ends of said horizontal slots 27 meet the ends of said horizontal slots 28 at the four corners of the corresponding carrier 10. See Figs. 2 and 3.

As shown, a steel band 29 is employed to releasably fasten or lock the four carriers illustrated to each other so these may be transported as a unitary structure, although said carriers may be fastened or locked together in some other suitable and convenient manner. To the purpose that the carriers 10 may be fastened or locked to each other, these are situated in a single plane and located in engagement, as in Figs. 1, 2 and 3, so that the adjacent end walls 13 and the adjacent side walls 12 of the different carriers, respectively, are abutting. Of course, when the carriers are so situated, grip depressions or hand holds 26 of the different carriers become alined, as do also all of the horizontal slots 27 and 28 of said different carriers, inasmuch as all of the carriers 10 are duplicates.

To the accomplishment of the releasable fastening or locking together of the carriers 10, the steel band 29 is placed about said carriers, while relatively positioned as in said Figs. 1, 2 and 3, situated within the horizontal slots 27 and 28, and tightened down by employment of a fastener clamp 30. More explicitly, the fastener clamp 30 includes a U-member 31 having its base pivotally secured, as at 32, to an end of said steel band 29, and its legs pivotally secured, as at 33, to an intermediate portion of a locking element or strip 34 of said fastener clamp. The end of the steel band 29 opposite the end to which the fastener clamp 30 is pivotally secured is constructed to provide a locking hook 35 adapted to receive the end 36 of the locking element or strip 34. Clearly, when the steel band 29 is situated within the horizontal slots 27 and 28, said band can be caused to be tightened down against the carriers 10, to thus cause said carriers to be fastened or locked to each other, by movement of the parts of the fastener clamp from their positions as in Fig. 4 to their positions as in Figs. 2 and 5. In these latter figures the locking element or strip 34 is down against the end portion of the steel band 29 adjacent the locking hook 35 and the end 36 of said locking element or strip 34 is engaged within said locking hook 35. Limit pieces 37 at the opposite sides of the locking element or strip 34 are for the purpose of engaging opposite side edges of the steel band 29 to insure that said locking element or strip will remain alined with said steel band. Evidently, the steel band 29 when tightened down will remain in clamped position about the carriers so these can be readily and easily transported as a unitary structure, as by grasping at the grip depressions or hand holds 26. At the same time, the carriers can be readily and easily released from each other, merely by actuation of the parts of the fastener clamp 30 from their positions as in Figs. 2 and 5 to or toward their positions as in Fig. 4. When the steel band 29 is taut about and against the carriers 10, the side edges of said band will be engaged against the side walls of the horizontal slots 27 and 28, thus to preclude the possibility of movement of any of said carriers relatively to others of the carriers, out of the single plane in which said carriers are fastened or locked by the steel band.

In commercial use of the article handing apparatus, say for the transportation of bottled beverages, each of the compartments 25 will contain an article or bottle. The handles for the carriers will be positioned as in Figs. 1 and 6 while the carriers are at the factory, so that said compartments 25 will be existent each to receive an article or bottle. Also, several carriers will be fastened or locked or strapped together, as in Figs. 1, 2 and 3, at the factory, thus to be transported to stores or other places of sale for the articles or bottles of beverage. The grip depressions or hand holds 26 provide convenient means for manual handling when several carriers are secured to each other. Ordinarily, a consumer may purchase but a single carrier full of the articles or bottled beverages, or, at any rate, less than four carriers full. The store keeper, or other salesman, will release the steel band 29 from the fastened or locked together carriers when this is intentional, so carriers can be transported separately, as to the abodes of consumers. The handles, consisting of the lengths or pieces 16 and 17 of wire or material, provide very satisfactory means for transporation of a single carrier 10. The carriers will ordinarily be returned, full of empty bottles, to the store keepers, or other salesmen, for re-use, over and over again, in the transportation of bottled beverages.

What is claimed is:

1. An apparatus of the character described, comprising a plurality of separate carriers each consisting of a base and spaced apart side and end walls extending upwardly from said base, means constituted as partitions within and a collapsible handle for each of said carriers for dividing the carriers into separate compartments each adapted to receive an article, and means for releasably clamping said carriers to each other with side and end walls of different ones of the carriers, respectively, in abutting relation.

2. An apparatus of the character described, comprising a plurality of separate carriers each consisting of a base and spaced apart side and end walls extending upwardly from said base, means constituted as partitions within and a collapsible handle for each of said carriers for dividing the carriers into separate compartments each adapted to receive an article, means for releasably clamping said carriers to each other with side and end walls of different ones of the carriers, respectively, in abutting relation, and hand holds for said unitary structure upon said carriers.

3. An apparatus of the character described, comprising a plurality of separate carriers each consisting of a base and spaced apart side and end walls extending upwardly from said base, means constituted as partitions within and a collapsible handle for each of said carriers for dividing the carriers into separate compartments each adapted to receive an article, and means for releasably clamping said carriers to each other with side and end walls of different ones of the carriers, respectively, in abutting relation, said last mentioned means being constituted as a continuous band of rigid material adapted to be locked in a slot provided in the carriers and about and against said carriers.

4. In an apparatus of the character described, a carrier consisting of a base and spaced apart side and end walls extending upwardly from said base, and means for dividing said carrier into separate compartments each adapted to receive an article, said means being constituted as spaced apart partitions within and extending across said carrier and collapsible members adapted selectively to be situated within the carrier crosswise of said partition walls and outside of said carrier to serve as a handle by which the carrier can be manually transported.

5. An apparatus of the character described, comprising a plurality of separate carriers each consisting of a base and spaced apart side and end walls extending upwardly from said base, means constituted as partitions within and a collapsible handle for each of said carriers for dividing the carriers into separate compartments each adapted to receive an article, each of said collapsible handles being adapted to be situated outside of its corresponding carrier to serve as means by which the carrier can be manually transported, and means for releasably clamping said carriers to each other with side and end walls of different ones of the carriers, respectively, in abutting relation.

6. An apparatus of the character described, comprising a plurality of separate carriers each consisting of a base and spaced apart side and end walls extending upwardly from said base, means constituted as partitions within and a collapsible handle for each of said carriers for dividing the carriers into separate compartments each adapted to receive an article, each of said collapsible handles being adapted to be situated outside of its corresponding carrier to serve as means by which the carrier can be manually transported, means for releasably clamping said carriers to each other with side and end walls of different ones of the carriers, respectively, in abutting relation, and hand holds for said unitary structure upon each of said carriers.

7. An apparatus of the character described, comprising a plurality of separate carriers each consisting of a base and spaced apart side and end walls extending upwardly from said base, means constituted as partitions within and a collapsible handle for each of said carriers for dividing the carriers into separate compartments each adapted to receive an article, each of said collapsible handles being adapted to be situated outside of its corresponding carrier to serve as means by which the carrier can be manually transported, and means for releasably clamping said carriers to each other.

8. An apparatus of the character described, comprising a plurality of separate carriers each consisting of a base and spaced apart side and end walls extending upwardly from said base, means constituted as partitions within and a collapsible handle for each of said carriers for dividing the carriers into separate compartments each adapted to receive an article, each of said collapsible handles being adapted to be situated outside of its corresponding carrier to serve as means by which the carrier can be manually transported, means for releasably clamping said carriers to each other, and hand holds for said unitary structure upon each of said carriers.

9. An apparatus of the character described, comprising a plurality of carriers for articles, and means for releasably fastening said carriers to each other with side and end walls of different ones of the carriers, respectively, in abutting relation constituted as a continuous band adapted to be locked about and against the carriers.

10. An apparatus of the character described, comprising a plurality of carriers for articles, and means for releasably fastening said carriers to each other with walls of different ones of the carriers, respectively, in abutting relation constituted as a continuous band adapted to be locked about and against the carriers.

11. An apparatus of the character described, comprising a plurality of carriers for articles, means for releasably fastening said carriers to each other with side and end walls of different ones of the carriers, respectively, in abutting relation constituted as a continuous band adapted to be locked about and against the carriers, and a handle upon each of said carriers.

12. An apparatus of the character described, comprising a plurality of separate carriers each consisting of a base and spaced apart side and end walls extending upwardly from said base, and means for releasably clamping said carriers to each other with side and end walls of different ones of the carriers, respectively, in abutting relation, said means being constituted as a continuous band of rigid material adapted to be locked in a slot provided in the carriers and about and against said carriers.

13. An apparatus of the character described, comprising a plurality of separate carriers each consisting of a base and spaced apart side and end walls extending upwardly from said base, means for releasably clamping said carriers to each other with side and end walls of different ones of the carriers, respectively, in abutting relation, said means being constituted as a continuous band of rigid material adapted to be locked in a slot provided in the carriers and about and against said carriers, and handle means upon each of said carriers.

14. An apparatus of the character described, comprising a plurality of separate carriers each consisting of a base and spaced apart side and end walls extending upwardly from said base, means constituted as partitions within and a collapsible handle for each of said carriers for dividing the carriers into separate compartments each adapted to receive an article, each of said collapsible handles being adapted to be situated outside of its corresponding carrier to serve as means by which the carrier can be manually transported, and means for releasably clamping said carriers to each other with side and end walls of different ones of the carriers, respectively, in abutting relation, said last mentioned means being constituted as a continuous band of rigid material adapted to be locked in a slot provided in the carriers and about and against said carriers.

JAMES K. McLEOD.